TELEVISION TEST APPARATUS

Filed Nov. 1, 1954 3 Sheets-Sheet 1

INVENTOR.
Steven Wlasuk
BY
[signature]
ATTORNEY

July 22, 1958 S. WLASUK 2,844,646

TELEVISION TEST APPARATUS

Filed Nov. 1, 1954 3 Sheets-Sheet 2

INVENTOR.
Steven Wlasuk
BY
[signature]
ATTORNEY

INVENTOR.
Steven Wlasuk
BY
[signature]
ATTORNEY

United States Patent Office 2,844,646

Patented July 22, 1958

2,844,646

TELEVISION TEST APPARATUS

Steven Wlasuk, Brooklawn, N. J., assignor to Radio Corporation of America, a corporation of Delaware Application November 1, 1954, Serial No. 465,867

10 Claims. (Cl. 178—5.4)

The present invention relates to novel test apparatus for providing signals useful in testing color television receivers.

In accordance with standards promulgated by the Federal Communications Commission on December 17, 1953, color television information is transmitted in a manner which renders it compatible with black and white or monochrome receivers. Thus the standards are such that a first carrier wave, amplitude-modulated by luminance signals, conveys the type of information necessary for producing monochrome images on black or white receivers while a subcarrier wave together with the luminance signal, conveys the information required for reproduction of television images in color by color television receivers designed for operation upon the standard signals. More specifically, the subcarrier wave is of such frequency that it lies within the assigned monochrome video phase band, near the high end thereof, and is phase- and amplitude-modulated by color information regarding the several selected component colors. The instantaneous phase of the subcarrier wave with respect to a reference phase is indicative of a particular hue and the instantaneous amplitude is a measure of saturation. Since the detection of color at a receiver depends upon detection of the subcarrier phase the FCC standards further provide that a "burst" of subcarrier wave energy of fixed phase be transmitted on the "back porch" of each television horizontal blanking pulse for the purpose of synchronizing the receiver color sampler or demodulator oscillator with the corresponding oscillator at the transmitter.

Television receivers adapted to reproduce color images from signals of the above described type are normally designed to be capable of reproducing monochrome images from black and white broadcast signals and may be provided with apparatus for disabling the color channel circuitry during reception of black and white production signals. Such color channel disabling apparatus or "color killer" circuitry is ordinarily responsive to the absence of color synchronizing bursts from received monochrome signals.

It is a primary object of the present invention to provide novel apparatus for producing a test signal which is useful in checking the operation of color television receivers.

It has been found that a given color television receiver installation, while capable of providing satisfactory monochrome image rendition, may be incapable of proper color reproduction, so that a true test of a color receiver requires that it be provided with color television sub-carrier signals in addition to monochrome signals.

Hence it is another object of the present invention to provide apparatus capable of producing television test signals for determining the ability of color television receivers to reproduce color images.

By virtue of the fact that it is undesirable to interfere with the normal operation of television receivers which are not under test, it is a further object herein to provide test signal producing apparatus of such character that the test signals do not have any objectionable effect upon the image reproduction function of monochrome and color television receivers which are properly operating.

Still another object of the invention is the provision of means for producing a test signal which may be transmitted simultaneously with a monochrome television signal for use in checking the operation of color television carriers.

In general, the present invention provides means for producing a first burst of color subcarrier energy timed to occur slightly after the horizontal blanking pulse of a television scanning line and a second burst timed to occur slightly ahead of the next succeeding horizontal blanking pulse. Means are additionally provided for adding such bursts to a monochrome television signal being transmitted. Since neither of the bursts occurs during the horizontal blanking interval, a color television receiver which is tuned to the channel transmitting the composite monochrome television signal and color test signal is not affected by the bursts. Stated otherwise, the bursts produced in accordance with the invention cannot cause spurious color patterns on a properly adjusted color television receiver although the bursts afford an effective agency for checking color receivers under test.

Additional objects and advantages of the present invention will become apparent to persons skilled in the art from a study of the following detailed description of the accompanying drawing, in which.

Figures 1, 2:
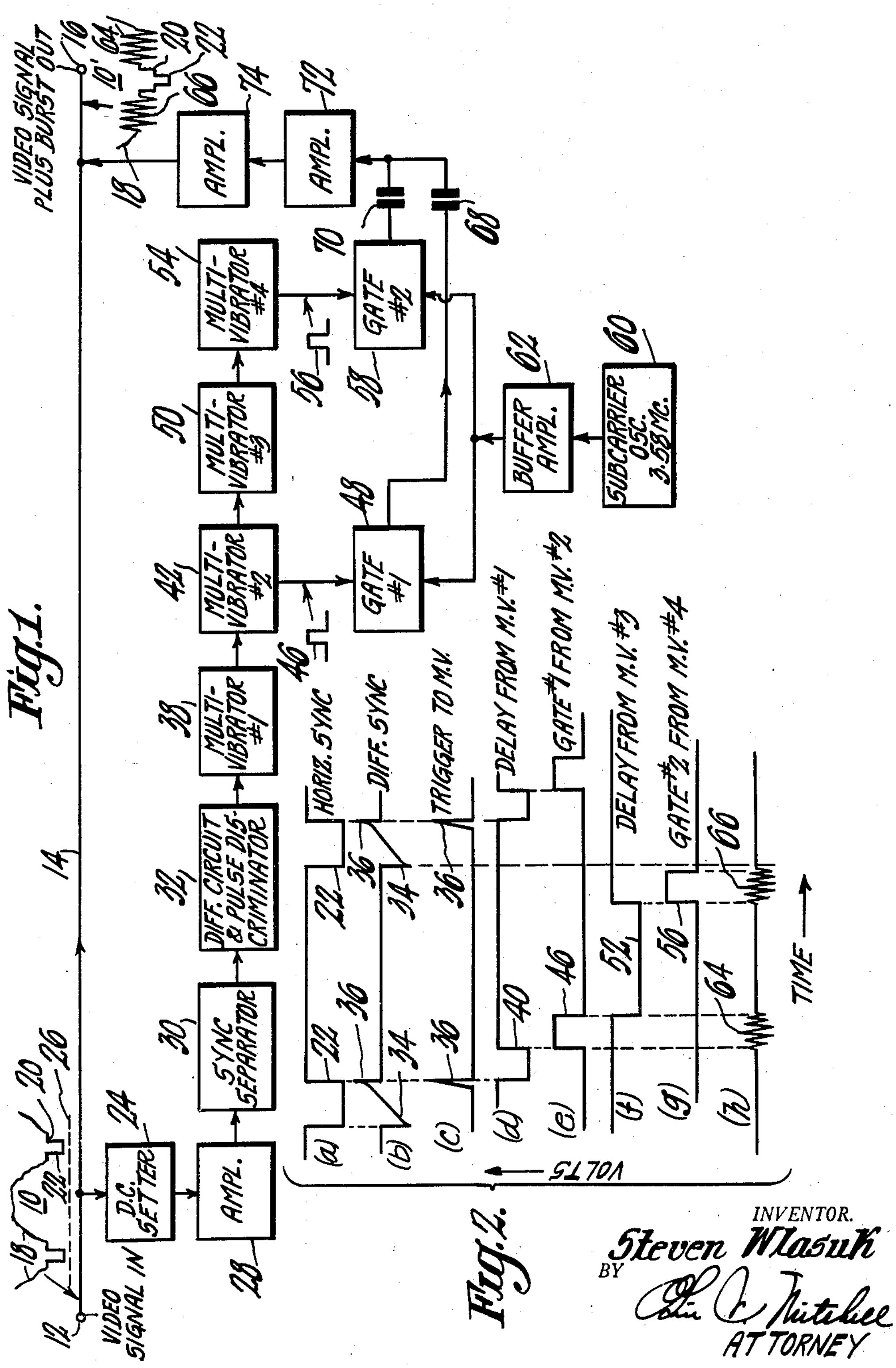
Fig. 1 is a block diagram of one form of the invention.
Fig. 2 illustrates a series of wave forms useful in explaining the operation of the apparatus of Fig. 1.

Referring to the drawing and, particularly, to Fig. 1 thereof, there is shown apparatus in accordance with the invention for use at a television transmitter station. Monochrome television signals 10 are applied from a source (not shown) to the input terminal 12 of a coaxial cable 14 whose output terminal 16 is adapted for connection, for example, to the transmitter carrier-modulating stages (not shown). The apparatus of the present invention is connected in parallel with the coaxial cable 14 between its extremities 12 and 16 so that, as will be understood more fully, failure of the test signal generating circuits can have no effect upon the normal passage of the monochrome television signals 10. The signal 10 comprises specifically video portions 18, horizontal blanking pulses or pedestals 20 and horizontal synchronizing pulses 22. It will further be understood by those skilled in the art that the composite television signal also includes vertical synchronizing and blanking pulses which are not shown in the drawing. The composite signal 10 is applied to a direct current (D. C.) level setting circuit 24 which establishes a D. C. axis 26 for the sync pulses 22 so that the blanking pedestals 20 are aligned along a similar D. C. axis of a different potential. The composite signal is then amplified by a stage indicated by the block 28 which also removes most all of video portions 18, after which it is applied to a synchronizing pulse separator circuit 30 that removes the remainder of video signal 18. The amplifier 28 and sync pulse separator 30 may be so designed, as will be indicated more specifically in connection with the schematic diagram of Figure 3, as to have a degenerative effect upon the vertical sync pulses. Thus the output signal of the sync separator 30 will comprise the horizontal sync pulses 22 as shown by waveform *a* of Figure 2, substantially free of vertical sync pulses.

The separated horizontal sync pulses 22 and vertical equalizing pulses are differentiated by a circuit 32 to provide alternate negative and positive spikes 34 and 36 (waveform *b* of Fig. 2). The time constants of circuit 32 are adjusted as to produce a larger positive spike from the longer horizontal sync pulses. Also associated with the differentiating circuit is a pulse discriminating circuit which selects and passes only the larger positive spikes 36 which correspond, in time, to the trailing edges of the horizontal sync pulses 22. The spikes 36 (waveform *c*) are applied to a first multivibrator 38 which is triggered thereby and which provides output pulses 40 (waveform *d*) whose leading edges are substantially coincident with the spikes 36 and whose trailing edges occur at a time determined by the timing circuit of the multivibrator. The output pulses 40 of the multivibrator 38, which may be termed the positioning multivibrator, are differentiated and used to trigger the start of second multivibrator 42. The multivibrator 42 provides a pulse 46 (waveform *e*) whose leading edge is substantially coincident with the trailing edge of the pulse 40, and means are included with multivibrator 42 for setting the duration of its output pulses 46. The pulses 46 are in turn applied to a first gate circuit 48, whose function will be described hereinafter.

The pulses 46 are also differentiated and the resultant spikes corresponding to their trailing edges are used to trigger a delay multivibrator 50. The multivibrator 50 provides, in response to pulses 46, an output pulse 52 (waveform *f*) whose duration is such that its trailing edge occurs a relatively short time prior to the commencement of the next horizontal blanking interval. Stated otherwise, the duration of the pulse 52 encompasses a substantial portion of that part of a television line period normally devoted to the video signals 18. The pulse 52 is then differentiated by a suitable circuit and the positive spike corresponding to its trailing edge is employed in triggering a fourth multivibrator 54. The multivibrator 54 provides at its output a pulse 56 (waveform *g*) which is applied to a second gate circuit 58. As will be noted from the waveforms of Figure 2, which are all drawn to the same time scale, the gating pulse 56 produced by the multivibrator 54 ends just prior to the second horizontal synchronizing interval shown on that figure.

As has been stated briefly supra, the apparatus of the present invention is provided to add bursts of color subcarrier frequency to a composite black and white television signal. Thus the apparatus of Fig. 1 further includes an oscillator 60 which provides a continuous wave of sinusoidal energy of color subcarrier frequency (3.579545 mc.). The subcarrier wave is supplied via a buffer amplifier 62 simultaneously to both gates 48 and 58. Each of the gates is normally nonconductive and is rendered conductive during the application of a gating pulse (e. g., the pulse 46 in the case of gate 48 and the pulse 56 in the case of the gate 58). Each of the gates is therefore caused to pass, during its period of conductivity, a burst of the subcarrier energy. Waveform *h* illustrates the bursts 64 and 66 passed by the gates 48 and 58, respectively. The output signals of the gates are applied via capacitors 68 and 70 to the input terminal of an amplifier 72. The bursts are further amplified by output stage 74 and are finally applied to the terminal 16 in additive relation to the television signals. The composite signal thus includes, in addition to the video portions 18, blanking pulses 20 and sync pulses 22, the subcarrier bursts 64 and 66, which bursts occur, respectively, just after and just prior to the horizontal blanking pulses. It is thereby noted that neither of the bursts provided in accordance with the invention coincides with or overlaps any part of a horizontal blanking pedestal.

Figure 3:
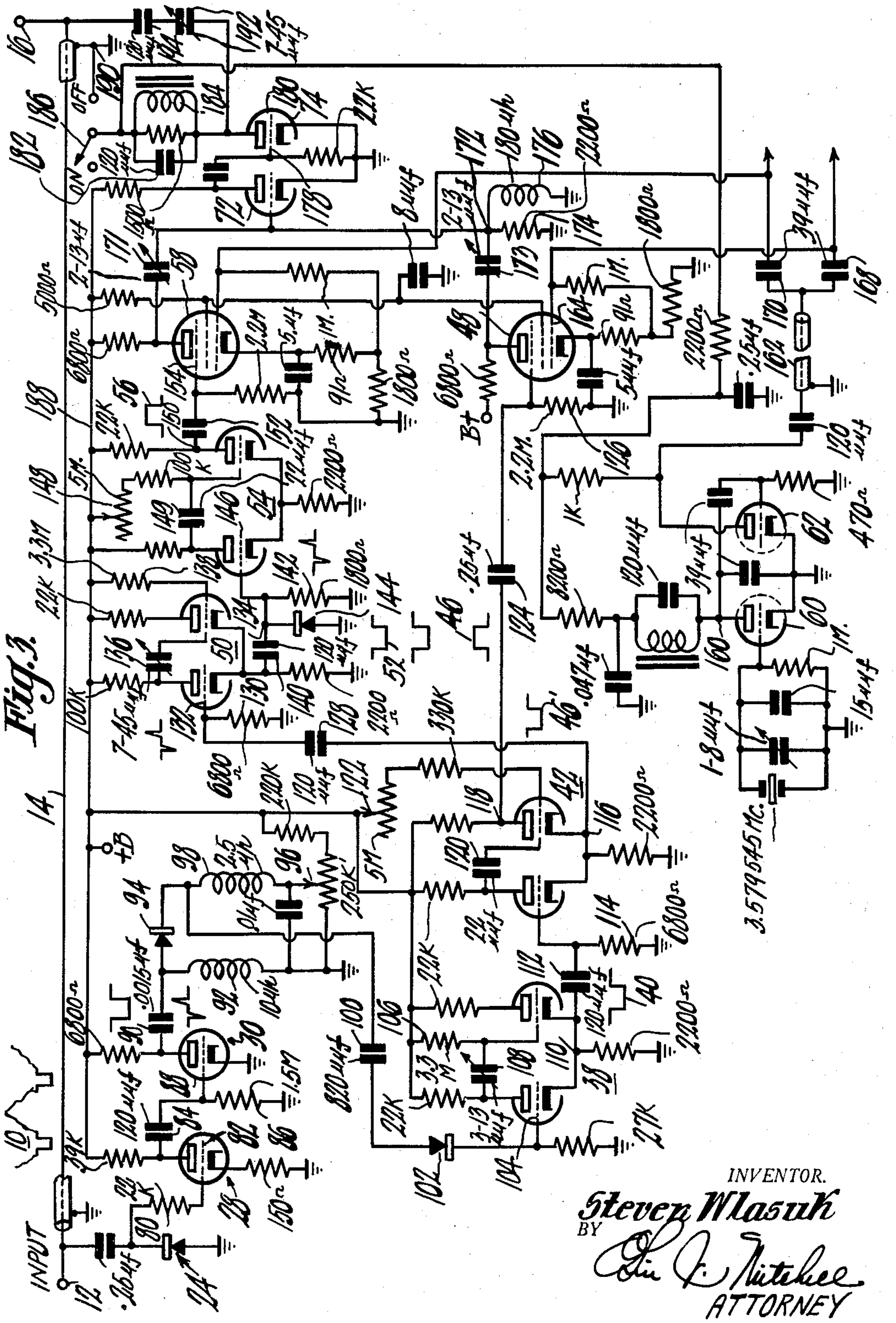
Fig. 3 is a schematic diagram of a specific circuit which is represented functionally by the block diagram of Fig. 1.

One specific circuit for performing the functions indicated by Fig. 1 is illustrated in its entirety in Fig. 3, wherein reference numerals identical to those used in connection with Fig. 1 will be employed to indicate corresponding stages. Referring now to Fig. 3, it will be seen that the composite monochrome video signal 10 has its D. C. axis established by the conventional diode restorer circuit 24 which is connected via a resistor 80 to the control electrode 82 of the amplifier 28. The amplified sync and partial video signals are applied via a capacitor 84 and resistor 86 to the control electrode 88 of a sync separator stage 30. By virtue of the small capacitor 84 which couples the tubes 28 and 30, loss of vertical synchronizing information (including the "serrations") occurs in passage of the signal between the two stages, since the capacitor is incapable of supplying current to tube 30 during the vertical sync pulses. The separated synchronizing pulses from the output of the tube 30 are differentiated by a capacitor 90 and inductance 92 to provide the alternate negative and positive spikes 34 and 36 of waveform *b* in Fig. 2. The values of elements 90 and 92 are so selected as to produce a greater positive spike from horizontal sync pulses than from the shorter vertical equalizing pulses. The larger positive spikes 36 are selected by a diode 94 whose cathode is supplied with a fixed positive bias from a potentiometer 96 through inductance 98 so that the diode passes only the more positive portion of the spike 36. The selected spikes are "accentuated" by means of the inductance 98 which serves as a "ringing" circuit and which is caused to ring by the positive spikes applied to it. Such ringing is applied via a capacitor 100 to a diode 102 which serves to select only the large amplitude positive half-cycle of ringing. For simplicity of description, the pulses passed by the diode 102 may be considered as being the same as the spikes 36 in an accentuated form.

In any event, the pulse 36 is applied as a trigger to the control electrode 104 of the left-hand tube of the multivibrator 38, which comprises a generally conventional cathode-coupled monostable multivibrator in which the right-hand tube is normally conducting and in which the left-hand tube is normally nonconducting. The positive trigger spike applied to the electrode 104 renders the left-hand tube conductive and causes cessation of conduction in the right-hand tube. The duration of conduction of the left-hand tube is determined by the time-constant circuit comprising a resistor 106 and a variable capacitor 108 bearing the designation "First bar position." By virtue of the positive bias on the control electrode of the right-hand tube, that tube, when conducting, conducts more heavily than does the left-hand tube. Thus, during the period of conduction of the left-hand tube which commences with the application of the trigger spike 36, a negative pulse 40 is produced at the common cathode terminal 110. This pulse 40 is differentiated by a capacitor 112 and resistor 114 and the resultant positive spike corresponding to the trailing edge of the pulse is employed in triggering the multivibrator 42.

The last mentioned multivibrator is also a cathode coupled monostable device and provides at its output terminals 116 and 118 negative and positive pulses, respectively, whose durations are determined by the time-constant circuit comprising the capacitor 120 and the variable resistor circuit 122. The positive pulse from the terminal 118 corresponds to the pulse 46 of waveform *e* and is applied via a capacitor 124 to the suppressor electrode 126 of the gate tube 48. The negative pulse, designated 46', is differentiated by a capacitor 128 and a resistor 130 to provide alternate negative and positive spikes for application to the control electrode 132 of the left-hand tube of the multivibrator 50. The multivibrator 50 is of the same type as the described multivibrators 38 and 42 and operates in substantially the same manner. That is, the left-hand tube of the multivibrator 50 is normally nonconducting, while the right-hand tube is normally conducting. The positive-going spike of waveform 128 (derived from the pulse 46′) triggers the multivibrator such that there is produced at its output terminal 132 the negative pulse 52. The duration of the pulse may be varied by means of the adjustable capacitor 136 which, together with resistor 138, establishes the time constant of the multivibrator. The pulse 52 is differentiated by a capacitor 140 and a resistor 142 to provide alternate negative and positive spikes coincident with its leading and trailing edges, respectively. The negative spike is short-circuited to ground by a diode 144 and the positive spike is applied as a trigger to the control electrode 146 of the left-hand tube of the multivibrator 54.

The multivibrator 54 is substantially identical with the multivibrator 42 and includes a pulse-width selecting resistor 148, and fixed capacitor 149. At the output terminal 150 of the multivibrator 54 there is provided the gating pulse 56 which is applied via a capacitor 152 to the suppressor electrode 154 of the gate tube 58.

The oscillator 60 is illustrated as a conventional crystal controlled oscillator at whose output terminal 160 there is provided a continuous wave of subcarrier frequency (viz., 3.58 mc.). This continuous subcarrier frequency wave is applied via a buffer amplifier 62 to the input of a cable 162 whose output terminal is coupled to the control electrodes 164 and 166 of the gates 48 and 58, respectively, through equal capacitors 168 and 170.

As thus far described, it will be understood that each of the gates 48 and 58 receives continuous subcarrier frequency energy and is pulsed into conductivity by the gate pulses 46 and 56. The output of the gates 48 and 58 are applied to a common terminal 172 through adjustable capacitors 171 and 173 where they are added across the resistor 174. Capacitors 171 and 173 serve to adjust individual amplitudes. An inductance 176 connecting across the resistor 174 serves as a low impedance path to ground for any gating pulse voltage appearing at the terminal 172, thus eliminating switching transients from the signal at that terminal. The bursts are amplified in the stage 72 and are applied to the control electrode 178 of the final or output amplifier tube 74. The anode 180 of the tube 74 is connected to a parallel resonant circuit comprising a capacitor 182 and an inductance 184 which, with the tube 74, is sharply tuned to the subcarrier frequency. The resonant circuit serves the purpose of rounding off the envelope of the bursts so that, as will be explained more fully, the visibility of the bursts on receivers not under test is reduced. By means of an "on-off" switch 186, the anode circuits of the tubes 74, 60 and 62 may be connected to either the B+ lead 188 or to a grounded terminal 190. In the operation of the test signal generating apparatus, the switch is in its left-hand position so that the amplifier 74, the subcarrier oscillator 60 and buffer 62 are connected to the B+ supply. Finally, in connection with the arrangement of Fig. 3, it will be noted that the output signal of the amplifier 74 is applied via capacitors 192 and 194 to the output terminal 16 of the cable 14 for adding the bursts to the television signal 10.

Since the operation of the specific circuit of Fig. 3 was described in connection with the block diagram of Fig. 1, it need not be repeated. It is to be noted, however, that a wide latitude of control is afforded for the timing and duration of each of the gate pulses 46 and 56, so that the former pulse enables its associated gate to pass a burst of subcarrier wave shortly after the end of each horizontal blanking pulse and so that the pulse 56 causes its gate to pass a similar burst shortly ahead of each horizontal blanking pulse. The bursts 64 and 66, when added to the monochrome television signal applied to the cable 14, appear as shown by the waveform 10′ at the terminal 16 in Fig. 1.

Figure 4:
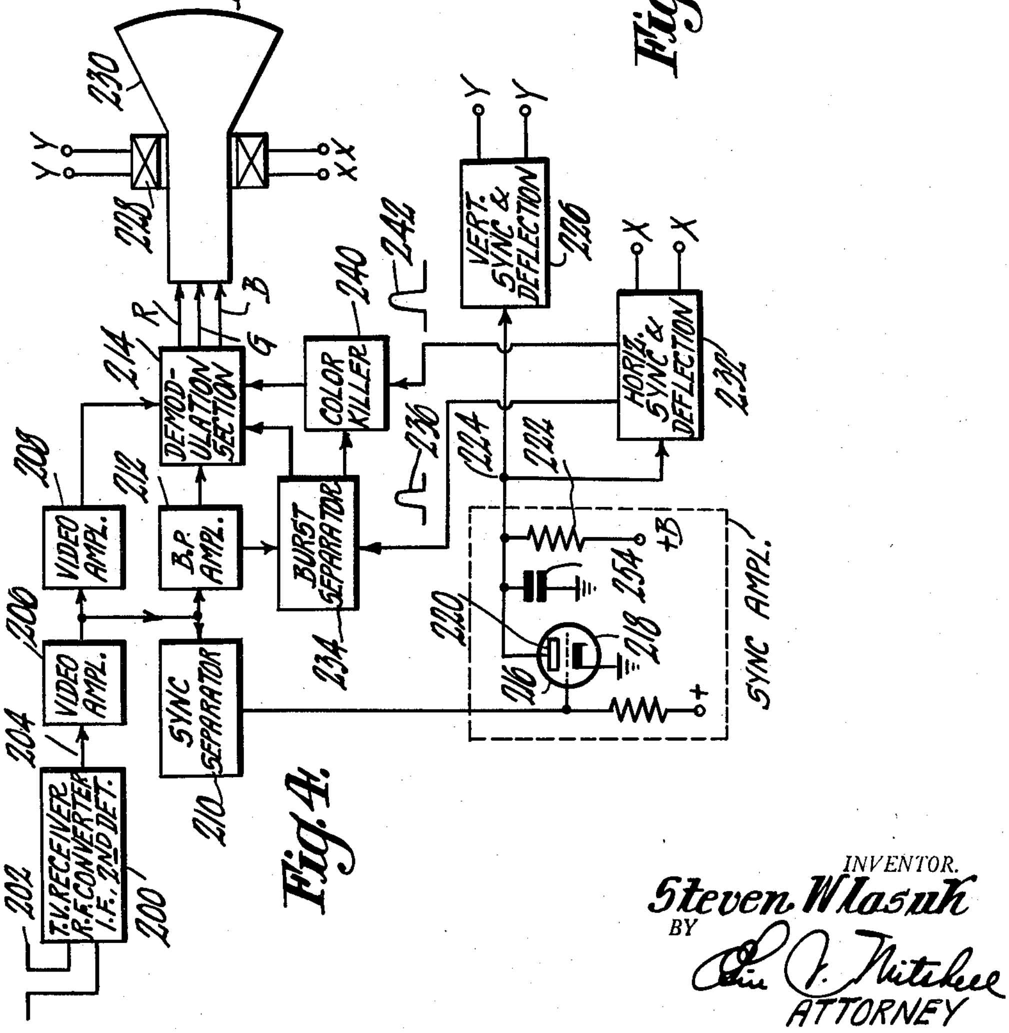
Fig. 4 is a block diagram of a typical color television receiver.

In order that the utility of the present invention may be clearly understood, an appreciation of the operation of a color television receiver designed for use with the standard signals is necessary. Hence, Fig. 4 illustrates a typical color television receiver such as the one described in detail in a publication entitled, "Practical Color Television for the Service Industry," revised edition, published April 1954, by the RCA Service Co., Inc., a Radio Corporation of America subsidiary. Since detailed circuitry and their explanation may be found in the publication, it is sufficient here to describe such a receiver generally. The receiver of Fig. 4 comprises a tuner section 200 adapted to be furnished with received television signals from an antenna 202. The tuner includes R. F., converter, I. F., and second detector stages which provide the detected composite signal at the lead 204. Assuming, for the purpose of explaining the receiver arrangement, that the received signal is a color television broadcast signal, including luminance information and chrominance information in the form of a phase- and amplitude-modulated subcarrier wave, the composite detected signal is amplified by a stage 206 and applied simultaneously to a video or luminance amplitude 208, a sync separator 210 and a bandpass amplifier 212. The bandpass amplifier 212 passes the subcarrier frequency and its sideband information to a demodulator section 214. The sync separator 210 removes the horizontal and vertical sync pulses from the composite signal and applies them to the control electrode 216 of a sync pulse amplifier 218. The amplifier anode 220 is connected to a B+ terminal through a load resistor 222 across which there appears, at terminal 224, the amplified sync pulses. The vertical sync pulses are selected and amplified by circuitry within the block 226 and are employed to synchronize a vertical scanning oscillator which provides sawtooth currents of television field frequency to the terminals Y, Y.

These terminals are, as shown, connected to the vertical deflection winding forming a part of the yoke 228 associated with the tricolor kinescope 230. The horizontal sync pulses are selected and employed similarly in the block 232 for synchronizing the operation of a horizontal deflection oscillator which supplies sawtooth currents of line rate to the horizontal deflection winding terminals X, X.

As explained in the cited publication, operation of the color signal demodulating section requires the use of a burst separator circuit 234 which receives the composite subcarrier information from the bandpass amplifier and pulses 236 derived from the horizontal deflection transformer. The pulses 236 are timed to coincide with the "back porch" of the horizontal blanking pulse whereby the burst separator is gated to pass only the color synchronizing bursts. The separated bursts are applied to the demodulator section 214 where they snchronize the operation of the receiver color sampling oscillator. The demodulator section, thus synchronized with the color transmitter, provides at its output terminals red, green and blue video signals which are applied suitably to the kinescope 230.

As has been mentioned, typical color television receivers such as the one described in the cited publication include a "color killer" such as the one indicated by the block 240 which performs the function of disabling the demodulator section during the reception of a black and white broadcast signal which lacks the color synchronizing bursts. The operation of the "color killer" is generally as follows: The output of the burst separator 234 is supplied to the circuit 240 which also receives a pulse 242 from the horizontal deflection transformer timed to occur in general coincidence with the pulse 236. In the event that no color synchronizing burst is present at the output of the burst separator, the color killer provides a suitable bias for disabling the demodulator section. In such case, the luminance signal from the amplifier 228 is passively applied by circuitry in the demodulator section to the kinescope which reproduces the black and white image represented by that signal.

As will be appreciated from the foregoing, proper operation of such a receiver requires that it be capable of producing either monochrome or tricolor images, depending upon the type of broadcast signals being received. Where a given television program is being broadcast as monochrome material, the present invention with its test signal may be employed to provide service men in the field with an effective check for color television receivers without perceptibly interfering with the functioning of other receivers tuned to that channel. That is to say, the bursts 64 and 66 will not produce any visible color on a normal color receiver which is operating in normal fashion since neither of the bursts occurs at a time in which the usual color synchronizing burst would be present. Hence, the color killer circuit 240 effectively prevents the reproduction of color by the receiver. Moreover, while the 3.58 mc. bursts might by expected to produce a high frequency pattern in narrow stripes on a black and white receiver, such a pattern has been found to be unobjectionable.

Figure 5:
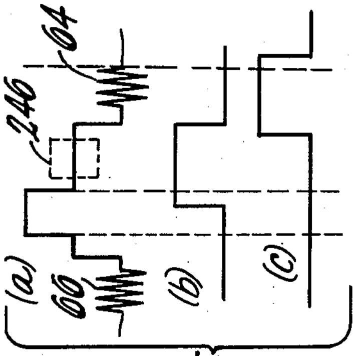
Figs. 5 and 6 illustrate additional wave forms to be described.

In order to use the color test signal provided in accordance with the invention, it is necessary to shift the phasing of the horizontal deflection circuits of a receiver under test so that its burst separator will accept and pass the burst 64 which occurs after each horizontal blanking pulse. This requirement will be better understood from the showing of Fig. 5, wherein waveform *a* shows, by the dotted line rectangle 246, the normal location of the standard color synchronizing burst. Waveform *b* illustrates the usual gating pulse applied to the burst separator in a color receiver which is operating normally. The burst gating pulse is timed to encompass the interval of the color synchronizing burst and does not encompass the test burst 64. Thus the burst gating pulse derived from the horizontal deflection circuits must be shifted in phase so that it occurs as shown in waveform *c*, namely, at a time which encompasses the burst 64. Such shifting of the phase of the horizontal deflection waveforms in a receiver is in many cases readily accomplished merely through adjustment of the receiver's "horizontal hold control" or other horizontal frequency selection devices.

Figure 6:
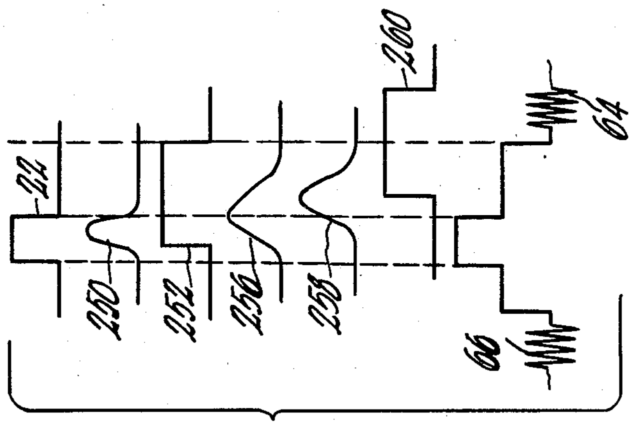

In the case of a receiver such as that set forth in the RCA publication which employs the so-called "Synchroguide" form of horizontal oscillator and automatic frequency control, shifting of the phase of the horizontal oscillator in the amount necessary for using the burst signal of the invention is not possible through the mere adjustment of its horizontal hold control. In such event, it is necessary to perform a different operation upon the horizontal deflection wave forms. One suitable arrangement for effecting such a phase shift is illustrated by the waveforms of Fig. 6. In that figure, the pulse 22 corresponds to the horizontal deflection pulse and the pulse 250 is illustrative of the pulse normally derived from the horizontal deflection output transformer during horizontal retrace as timed by the former pulse. A pulse such as the pulse 250 normally produces a burst gating pulse such as the one shown at 252. By connecting a small capacitor 254 across the output of the sync pulse amplifier 218 (Fig. 4) it is possible to effect an integration of the horizontal sync pulse 22 so that it appears as at 256. The horizontal output transformer pulse corresponding to the last-named pulse would then be as illustrated by the pulse 258 which, in turn, would produce a burst gating pulse 260. The new gating pulse 260 encompasses, as shown, the first color burst 64 added to the monochrome television signal by the invention.

Regardless of the manner in which the burst gate or separator 234 is caused to pass the burst 64, it will be apparent that the bursts 66 will cause the receiver to produce a vertical stripe of color in the right hand side of the kinescope raster due to burst 66. Since, in accordance with the FCC standards, the phase of the color synchronizing or "reference" burst is intermediate the phase angles assigned to red and green phases, and since both bursts 64 and 66 are essentially the same phase; the color stripe produced by the receiver under test, assuming that the receiver color circuits are properly aligned, will be yellowish-green. If the color of the test stripe is other than that set forth, such fact is indicative that the alignment of the receiver color demodulator receivers is incorrect.

The bursts produced in accordance with the invention further afford a test in the nature of a "Go–No–Go" check. That is to say, assuming that the horizontal deflection waveforms have been shifted but that no color stripe is produced by the receiver kinescope, it would then be apparent that one or more of the following difficulties existed, inter alia.

Loss of color subcarrier between the transmitting station and the location of the receiver, inadequacy of the antenna installation, improper lead-in between the antenna and the receiver tuner and/or improper response of the receiver circuit to the color subcarrier frequencies.

In addition to the foregoing, the bursts afford a check of the adjustment of the horizontal deflection circuits in a receiver since a receiver which is presumably adjusted for normal operation but which produces a color stripe in response to the burst 66 is obviously in need of readjustment of its horizontal deflection circuits, since otherwise its burst separator and color killer circuits would have prevented the reproduction of color. Assuming, however, that the color killer circuit of a receiver which is properly adjusted as to deflection circuitry were "opened" by noise or other extraneous signals, two multicolor stripes would be visible on the receiver. The color of the bands or stripes would then be determined by the random or non-synchronous phase of the receiver subcarrier oscillator as opposed to the phase of the transmitted subcarrier test bursts. The rapidity of color change in the two stripes is a measure of the free running frequency of the receiver subcarrier oscillator as compared to the transmitter subcarrier frequency. Thus, if the two frequencies are fairly close the colors will shift slowly and, conversely, if the two frequencies are more widely separated, the rate of color change will be correspondingly more rapid.

Despite the variety of tests which may be made employing the bursts produced in accordance with the invention, such bursts, as pointed out, do not create objectionable patterns on other receivers. Such non-interference is further insured by the rounding off of the burst envelope as afforded by the tuned circuit 182, 184 in Fig. 3, since the beginning and end cycles of each burst are deprived somewhat of the steep edges. The result, insofar as may be seen on a receiver kinescope, is a general blending in of the burst with the monochrome television image.

While specific values have been shown in connection with the circuit diagram of Fig. 3 in the interest of completeness of description, it will be understood that those values are intended solely as illustrative.

Having thus described my invention, what I claim as new and desire to secure by Letters Patent is:

1. Color television test signal generating apparatus for use in a television system in which a horizontal blanking pulse is transmitted between successive television line scansions, said apparatus comprising: gating means operating in synchronism with such line scansions for producing a first burst of carrier wave of fixed frequency timed to occur just after a horizontal blanking interval and a second burst of carrier wave of the same frequency as said first frequency timed to occur just prior to the next horizontal blanking interval; a source of a monochrome television signal; and adder means coupled to said source and said first-named means for combining said first and second bursts with such monochrome television signal in such manner that said bursts are confined exclusively to the intervals between such blanking intervals.

2. Color television test signal generating apparatus for use in a television system in which a horizontal blanking pulse is transmitted between successive television line scansions, said apparatus comprising: gating means operating in synchronism with such line scansions for producing a first burst of carrier wave of fixed frequency timed to occur just after a horizontal blanking interval and a second burst of carrier wave of the same frequency as said first frequency timed to occur just prior to the next horizontal blanking interval; a source of a monochrome television signal having horizontal blanking intervals free of such carrier frequency; and adder means coupled to said source and to said first-named means for combining said first and second bursts with such monochrome television signal in such manner that said bursts are confined exclusively to the intervals between such blanking intervals.

3. Color television test signal generating apparatus for use in a television system in which a horizontal blanking pulse is transmitted between successive television line scansions, said apparatus comprising: a source of a monochrome television signal having blanking pulses between successive television line scansions and free of amplitude modulation except for line scanning synchronizing pulses; wave generating means coupled to said source and operative in synchronism with said synchronizing pulses for producing a first burst of carrier wave of fixed frequency timed to occur just after a horizontal blanking interval and a second burst of carrier wave of the same frequency as said first frequency timed to occur just prior to the next horizontal blanking interval; and adder means coupled to said last-named means for combining said first and second bursts with such monochrome television signal in such manner that said bursts are confined exclusively to the intervals between such blanking intervals.

4. Color television test signal generating apparatus for producing a signal useful in testing a color television receiver of the type adapted to reproduce either a color image from a color television signal having a color synchronizing signal between successive scansions or a monochrome image from a monochrome television signal lacking such color synchronizing signal, both of such signals having horizontal blanking pulses between successive line scanions, said apparatus comprising: wave generating means including gating circuitry for producing a first burst of carrier wave energy of fixed frequency and timed to occur just after a horizontal blanking pulse and a second burst of carrier wave energy of said fixed frequency and timed to occur after such first burst but prior to the next succeeding blanking pulse; and adder means for adding said bursts to a monochrome television signal.

5. Color television test signal generating apparatus for producing a signal useful in testing a color television receiver of the type adapted to reproduce either a color image from a color television signal having a color synchronizing signal between successive scansions or a monochrome image from a monochrome television signal lacking such color synchronizing signal, both of said signals having horizontal blanking pulses between successive line scansions, said apparatus comprising: wave generating means for producing a first burst of carrier wave energy of fixed frequency and timed to occur just after a horizontal blanking pulse and a second burst of carrier wave energy of said fixed frequency and timed to occur just prior to the next succeeding blanking pulse; a source of monochrome television signals, said wave generating means comprising gating means, a source of such carrier wave conected to said gating means and means for pulsing said gating means just after a horizontal blanking pulse and just prior to the next succeeding blanking pulse; a source of monochrome television signals; and adder means for adding said bursts to a monochrome television signal from said source.

6. Color television test signal generating apparatus for producing a signal useful in testing a color television receiver of the type adapted to reproduce either a color image from a color television signal having a color synchronizing signal between successive scansions or a monochrome image from a monochrome television signal lacking such color synchronizing signal, both of said signals having horizontal blanking pulses between successive line scansions, said apparatus comprising: wave generating means including gating circuitry for producing a first burst of carrier wave energy of fixed frequency and timed to occur just after a horizontal blanking pulse and a second such burst timed to occur after said first burst but prior to the next succeeding blanking pulse; and adder means for adding said bursts to a monochrome television signal in such manner that said bursts occur only between such blanking pulses.

7. In combination with monochrome television signal developing apparatus for use in a television system in which a horizontal blanking pulse free of amplitude-modulation except for a scanning synchronizing pulse is transmitted between successive television scansions, color test signal generating apparatus comprising: wave generating means for producing a first burst of carrier wave of fixed frequency timed to occur just after a horizontal blanking interval and a second burst of carrier wave of the same frequency as said first frequency timed to occur just prior to the next horizontal blanking interval, said wave generating means comprising gating means supplied with such carrier wave and pulse generating means coupled to said gating means for causing said gating means to pass said bursts of carrier wave; a terminal adapted to receive a monohcrome television signal from said monochrome signal developing apparatus; and means coupled to said terminal and to said burst-producing means for combining said first and second bursts with such monochrome television signal in such manner that said bursts are confined exclusively to the intervals between such blanking intervals.

8. Color television test signal generating apparatus which comprises: a source of carrier wave; first and second gates coupled to said source in wave-receiving relation therewith; a terminal adapted to receive a monochrome television signal having television line synchronizing pulses between successive television line scansions; pulse-generating means coupled to said terminal for producing a first gating pulse occurring during the first portion of a line scansion interval; means coupled between said pulse-generating means and said first gate for applying pulses from said pulse generating means to said first gate in such manner as to cause said first gate to pass a burst of such carrier wave during the application of each such pulse; second pulse-generating means coupled between said terminal and said second gate for causing said second gate to pass a second burst of such carrier wave occurring during the latter portion of said line scansion interval; and means for combining said first and second bursts with a monochrome television signal in such manner that the intervals between said line scansion intervals are free of such carrier wave.

9. Color television test signal generating apparatus which comprises: a source of carrier wave; first and second gates coupled to said source in wave-receiving relation therewith; a terminal adapted to receive a monochrome television signal having television line synchronizing pulses between successive television line scansions; pulse-generating means coupled to said terminal for producing a first gating pulse occurring during the first portion of a line scansion interval; means coupled between said pulse-generating means and said first gate for applying pulses from said pulse generating means to said first gate in such manner as to cause said first gate to pass a burst of such carrier wave during the application of each such pulse; second pulse-generating means coupled between said terminal and said second gate for causing said second gate to pass a second burst of such carrier wave occurring during the latter portion of said line scansion interval; means for rendering the envelopes of said bursts nonrectangular; and means for combining said first and second bursts with a monochrome television signal in such manner that the intervals between said line scansion intervals are free of such carrier wave.

10. Color television test signal geenrating apparatus which comprises: a source of carrier wave; first and second gates coupled to said source in wave-receiving relation therewith; a terminal adapted to receive a monochrome television signal having television line synchronizing pulses between successive television line scansions; pulse-generating means coupled to said terminal for producing a first gating pulse occurring during the first portion of a line scansion interval; means coupled between said pulse-generating means and said first gate for applying pulses from said pulse generating means to said first gate in such manner as to cause said first gate to pass a burst of such carrier wave during the application of each such pulse; second pulse-generating means coupled between said terminal and said second gate for causing said second gate to pass a second burst of such carrier wave occurring during the latter portion of said line scansion interval; and means for combining said first and second bursts with a monochrome television signal in such manner that the intervals between said line scansion intervals are free of such carrier wave, said last-named means including a resonant circuit sharply tuned to said carrier frequency.

References Cited in the file of this patent

UNITED STATES PATENTS

| | | |
|---|---|---|
| 2,683,187 | Rynn | July 6, 1954 |
| 2,693,530 | MacDonald | Nov. 2, 1954 |